March 24, 1970     R. E. ANDEEN ET AL     3,502,855
DIFFERENTIAL ANALYZER WITH VARIABLE INTEGRATION LIMITS
Filed June 6, 1967
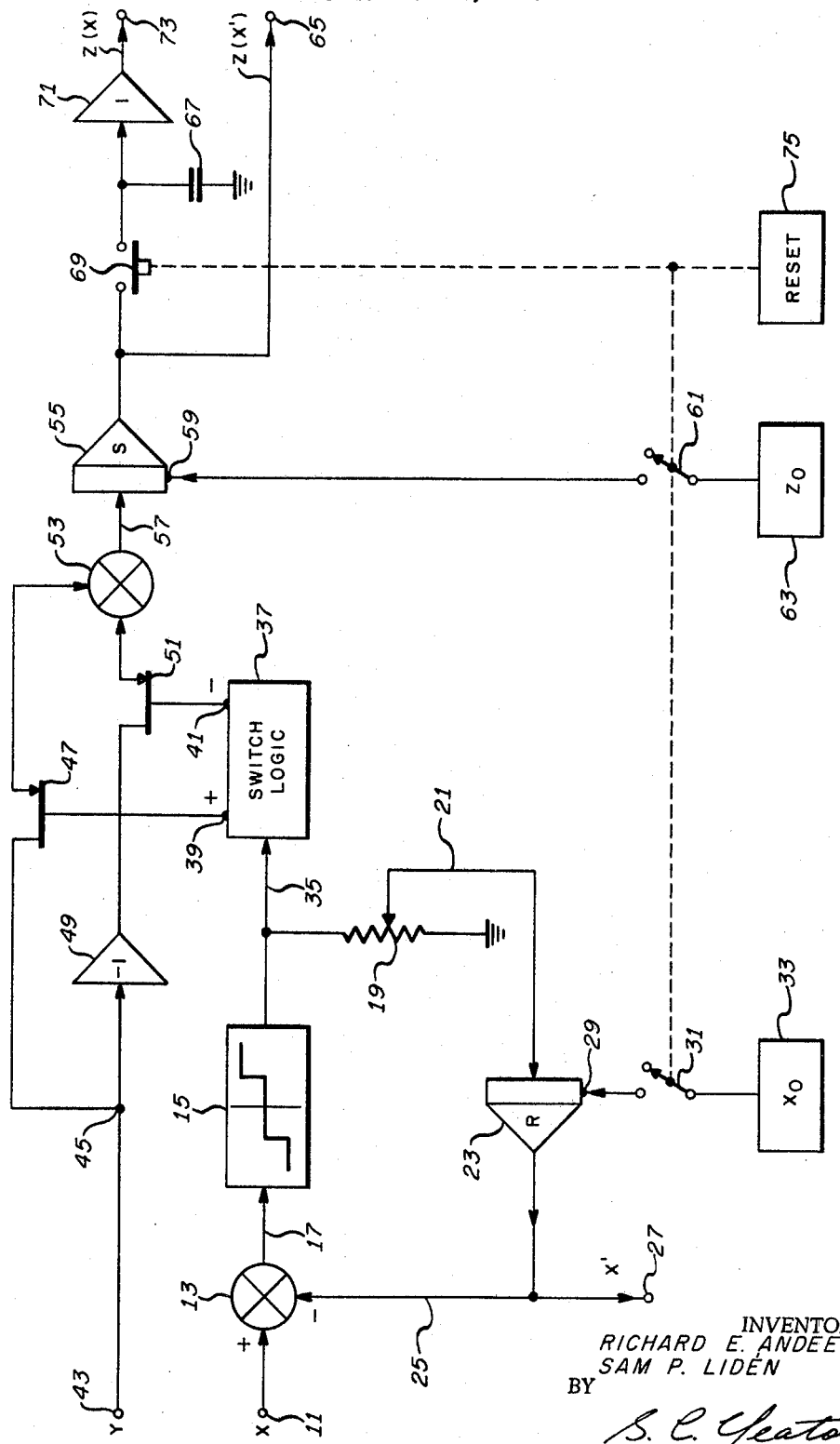
INVENTORS
RICHARD E. ANDEEN
SAM P. LIDÉN
BY
*S. C. Yeaton*
ATTORNEY

United States Patent Office 3,502,855
Patented Mar. 24, 1970

3,502,855
DIFFERENTIAL ANALYZER WITH VARIABLE INTEGRATION LIMITS
Richard E. Andeen, Phoenix, and Sam P. Lidén, Tempe, Ariz., assignors to Sperry Rand Corporation, a corporation of Delaware
Filed June 6, 1967, Ser. No. 643,988
Int. Cl. G06g 7/18
U.S. Cl. 235—183                                    10 Claims

ABSTRACT OF THE DISCLOSURE

Analog integration of a variable represented by a first voltage, with respect to an independent variable represented by a second voltage, is achieved by applying the second voltage to a follow-up loop comprising a first time integrator, a threshold circuit, and a summing junction. The output of the loop constitutes a control voltage proportional to the rate-of-change of the independent variable. The control voltage is applied to a switching circuit which chops the first voltage into pulses having amplitudes proportional to the magnitude of the first voltage and durations proportional to the rate-of-change of the second voltage. These are summed in a second time integrator whose output represents the output of the integrator of the invention. A periodic reset means provides repeated computation of the output to eliminate errors and to allow multiplexing.

BACKGROUND OF THE INVENTION

This invention relates to analog computing devices and more specifically to electronic differential analyzers.

Many types of analog integrators are known in the prior art. However, these prior art devices can usually integrate only with respect to time.

Furthermore, the utility of many prior art devices is limited in that accumulative errors build up during normal operation of these devices and so limit the accuracy of the results. The utility of these devices is also limited in that they cannot be multiplexed.

It is an object of the present invention to provide an analog integrator that can integrate with respect to any independent variable.

It is another object of the present invention to provide an analog integrator in which accumulative errors are eliminated.

It is still another object of the present invention to provide an analog integrator which can be multiplexed.

SUMMARY OF THE INVENTION

In the differential analyzer of the present invention, a signal representing the integrand is passed through a signal chopper that provides a signal duration proportional to the time rate-of-change of the independent variable. The chopped signal is then passed through a time integrator to provide an output representative of the integral of the integrand with respect to the independent variable. The signal chopper is started when the independent variable passes through a lower limit of integration and stopped when the independent variable reaches the upper limit of integration. A hold circuit is provided which stores the analyzer output and a reset means is operated periodically to recompute the output in order to eliminate accumulative errors.

BRIEF DESCRIPTION OF THE DRAWING

The single drawing is a block diagram illustrating the structure and mode of operation of the invention.

DESCRIPTION OF THE PREFERRED EMBODIMENT

The differential analyzer operates to solve equations of the general form:

$$Z(X) = Z_0 \pm K \int_{X_0}^{X} Y(X') dX'$$

Referring to the figure, a device constructed in accordance with the principles of the present invention includes an input terminal 11 to receive an independent variable X. This independent variable ordinarily serves as an upper limit of integration that may be varied or adjusted at will. The signal from the terminal 11 is applied to a conventional summing network 13 from which an error signal is derived. This error signal is equal in magnitude to the difference in magnitudes of the voltages applied to the input terminals of the summing network. The error signal is applied to a threshold detector 15 through a line 17. Threshold detectors of various types are known in the art. Descriptions of such circuits can be found, for instance, in Korn and Korn "Electronic Analog and Hybrid Computers," McGraw-Hill (New York), 1964. Specifically, this textbook describes "dead space comparators" in which an input signal produces no output until the input signal exceeds a certain "dead zone" value. A positive input signal exceeding this value produces a positive output signal having a definite amplitude. Similarly, a negative input signal exceeding the "dead zone" value results in a negative output signal having a definite amplitude.

The output of the threshold detector 15 represents a control voltage and is applied to a unit voltage-producing means such as a divider 19. The voltage dividing means 19 is adjusted so that a unit voltage appears on the line 21.

In practice, this voltage appearing on line 21 may be adjusted by setting the voltage dividing means 19. This adjustment provides a convenient means for changing the scaling of the integrator.

The unit voltage is applied to the input of a conventional time integrator 23. The output of the integrator 23 represents a "machine variable" signal X' and is applied through the line 25 to the summing network 13. The machine variable signal is also applied to an output terminal 27 where it is available for exterior use. The integrator 23 has a gain factor designated as R and also has an input terminal 29 by means of which an initial condition can be set into the integrator. Integrators of this type are known in the art and described in the Korn and Korn textbook previously cited. A switch 31 is connected to a source of voltage 33 by means of which an initial condition $X_0$ may be inserted into the integrator.

The unit voltage applied to the integrator 23 results in a linear machine variable voltage having a time rate-of-change whose magnitude is equal to the gain of the integrator and whose polarity is determined by the polarity of the input voltage.

During opertaion, X' approaches X at a rate determined by the gain of the inetgrator 23. Thus, the summing junction 13, the threshold detector 15, the unit voltage-producing means 19 and the integrator 23 are arranged in a follow-up loop configuration.

If X is changed at a rate greater than the gain of the integrator, integration with respect to time will take place during a time interval given by the ratio of the change in X divided by the integrator gain, and the integral will be available only after that interval. It is therefore desirable to provide an integrator gain as large as practical.

When the rate-of-change of the machine variable voltage X', the machine variable voltage X' will follow the independent variable X in a go-stop fashion as will be explained later.

The control voltage from the threshold detector is also applied through a line 35 to a switch logic circuit 37. The switch logic has a pair of output terminals 39 and 41. When a positive switching voltage is applied to the switch logic, a switch driver voltage appears at the terminal 39 and when a negative switching voltage is applied to the switch logic, a switch driver voltage appears at the terminal 41. If the error signal applied to the threshold detector is less than the "dead zone" threshold value, no signal appears at the output of the switch logic 37.

Thus the threshold detector cooperates with the switch logic and the voltage divider to provide an analog comparator that provides a positively polarized unit voltage and a first switch driver voltage in response to any positive error signal larger than a predetermined threshold and produces a negatively polarized unit voltage as well as a second switch driver voltage in response to any negative error signal larger than a predetermined threshold.

The integrand signal Y is applied to a terminal 43 and then to a junction 45. From the junction, the integrand may pass through a relay device such as a field effect transistor 47 in response to a voltage at the terminal 39, or through an inverting circuit 49 and a second relay device such as a field effect transistor 51 in response to a voltage at the terminal 41.

Signals passing through either transistor 47 or transistor 51 are applied to a second summing network 53 from which they may be coupled to a second time integrator 55 through a line 57. The integrator 55 has a gain factor conveniently designated as S.

The time integrator 55 is also supplied with an initial condition terminal 59. An initial value $Z_o$ may be applied to the terminal 59 through a switch 61 from a source 63.

The output of the integrator 55 is applied to an output terminal 65. This output is desginated the "machine output" $Z(X')$. The output of the integrator 55 is also applied to a hold capacitor 67 through a switch 69. This switch is closed periodically for a short interval in order to transfer the machine output to the hold capacitor 67. The voltage on the capaictor 67 is applied through a buffer amplifier 71 to an output terminal 73. The voltage at the output terminal 73 is designated as the "principal output" $Z(X)$.

A cyclical reset means 75 operates to close the switches 31 and 61 periodically so as to reset the integrators 23 and 55, and to operate switch 69. The reset means is timed so that the switch 69 is closed for a short interval and then opened a short time before each closure of the switches 31 and 61. This permits the capacitor 67 to maintain a voltage equal to whatever voltage appears at the output of the integrator 55 just before the resetting function occurs.

To better understand the opeartion of the invention, assume that an opearting cycle is started by applying a reset signal to the various elements. This establishes the initial conditions $X_o$ and $Z_o$. Assume further that a positive, slowly increasing independent variable X is applied to the terminal 11 and that a corresponding slowly varying integrand Y is applied to the terminal 43.

When the independent variable becomes large enough so that it exceeds the initial value $X_o$ by an amount equal to the dead zone threshold, the threshold detector 15 produces a positive switching voltage of a definite amplitude on the line 35. This causes a unit voltage to appear at the input time integrator 23 and also produces a switch driving voltage at the terminal 39 of the switch logic 37. The switch driver voltage permits the integrand signal to flow through the field effect transistor 47 and the summing network 53 to the second time integrator 55.

The output of the time integrator 55 produces a "machine output" at the terminal 65.

Since the independent variable was assumed to be increasing slowly, the machine variable voltage from the integrator 23 overtakes the independent variable applied to the terminal 11. When the difference between these voltages becomes less than the dead zone threshold, the threshold detector output ceases. This removes the unit voltage from the time integrator 23 and causes the switch logic to cut-off current flow through the transistor 47. This, of course, removes the input signal from the time integrator 55.

During this quiescent period, the independent variable at the terminal 11 continues to increase, whereas the machine variable voltage remains steady.

When the difference between the independent variable voltage and the machine variable voltage again becomes greater than the dead zone threshold, the control voltage from the threshold detector is re-established causing the machine variable voltage to again increase. The output from the threshold detector also permits the integrand signal from the terminal 43 to be again applied to the time integrator 55. The operation continues in a repetitive fashion during times that the independent variable is changing at a rate slower than the rate-of-change of the machine variable voltage.

This repetitive operation of the threshold detector causes the voltage on the line 57 to be applied to the time integrator 55 in a series of pulses where the instantaneous amplitude of the pulses is equal to the instantaneous amplitude of the integrand signal and the durations and repetition rates of the pulses are approximately proportional to the time rate-of-change of the independent variable. In other words, the area of the pulses is a measure of $$Y \frac{dX}{dt}$$

The time integrator 55 integrates these pulses with respect to time so that the output of the time inegrator 55 is proporional to $\int Y dX$.

The instantaneous value of this integral may be taken from the machine output terminal 65.

The reset means operates at a conveneint repetition rate. During a rest cycle, the machine output voltage is reduced to the level of $Z_o$. The principal output voltage at the terminal 73, however, remains at the level that it occupied just before the reset cycle began.

If a negative signal having a magnitude that is larger than the dead zone threshold is applied to the terminal 11, the threshold detector provides a negative unit voltage to the time integrator 23 and causes the switch logic to produce a switch driver voltage at the terminal 41. This permits the integrand signal Y to pass through the inverter 49, the field effect transistor 51 and the summing network 53 to the time integrator 55. The integration yields the same result whether the machine variable voltage approaches the independent variable voltage from above or below.

Although the reset function is not essential to the integration process, it provides several advantages in a practical circuit. The errors due to the dead zone in the threshold detector do not accumulate. The integration can be made to start from the initial condition for every integration cycle so that the dead zone is encountered only at the end of each cycle.

The reset function permits the use of lower tolerance components in the time integrators since much greater drift can be tolerated when the periodic reset is used.

The period of the reset cycle is not critical. However, in a practical application frequent resetting is usually desirable. Resetting periods in the order of twenty milliseconds have been used in typical applications.

The reset function also permits the use of multiplexing techniques since a single integrator may be time shared to process information in several channels.

Situations frequently arise in which the integrand Y is available as a function of the machine variable $X'$.

The principal output Z(X) may then be given as a function of X:

$$Z(X) = Z_0 + \frac{S}{R} \int_{X_0}^{X} Y(X') dX'$$

where S and R represent the gains of the first and second time integrators respectively.

The various terminals on an integrator or combinations of integrators may be interconnected to generate solutions to a wide variety of differential equations. Thus, for example, functions such as gamma functions, Bessel functions, or elliptic integrals may be solved by such configurations.

A single integrator may be used, for instance, to generate the square of X by applying the machine variable signal from terminal 27 directly to the integrand terminal 43. The parameters $X_0$, $Z_0$, S and R may be selected arbitrarily. The device will then perform the operation:

$$Z(X) = Z_0 + \frac{S}{R} \int_{X_0}^{X} X' dX' = Z_0 + \frac{S}{2R}(X^2 - X_0^2)$$

By applying the machine output voltage at terminal 65 to the integrand input terminal 43, the exponential $e_X$ may be generated.

While the invention has been described in its preferred embodiment, it is to be understood that the words which have been used are words of description rather than limitation and that changes may be made without departing from the true scope and spirit of the invention.

We claim:

1. A differential analyzer comprising means to receive an integrand signal; means to receive an independent variable signal; first time integrating means; means for producing an error signal having a magnitude that is always equal to the difference in magnitudes between a received independent variable signal and a signal from said first time integrating means; threshold detector means to produce a control signal when and only when an error signal exceeds a predetermined threshold value; means to produce a unit voltage in response to a control signal; means to couple a unit voltage to the input of said first time integrating means; second time integrating means; control signal responsive means to couple an integrand signal to said second time integrating means during the occurrence of a control signal; and output means to couple a signal from said second time integrating means to exterior utilization apparatus.

2. The apparatus of claim 1 further containing a machine variable output terminal connected to the output of said first time integrating means.

3. The apparatus of claim 2 in which the threshold detector means produces a control signal having a polarity the same as that of the error voltage to which it responds, and in which the unit voltage producing means is a voltage divider.

4. The apparatus of claim 3 in which the control responsive means includes a first switching means that is actuated in response to a control signal.

5. The apparatus of claim 4 in which the control responsive means further includes an inverting means and a second switching means, said first switching means being connected to pass an integrand signal to said second time integrating means in response to a positive control signal, said inverting means and said second switching means being connected to pass an inverted integrand signal to said second time integrating means in response to a negative control signal.

6. The apparatus of claim 5 in which said first and said second time integrating means include means to introduce voltages representing an initial condition into the individual integrating means.

7. The apparatus of claim 6 in which the output means includes a capacitor and a normally open switch arranged for optionally connecting said capacitor across the output of said second time integrating means.

8. The apparatus of claim 7 further containing reset means for periodically reinserting voltages representing initial conditions into said time integrating means.

9. The apparatus of claim 8 in which the reset means further operates periodically to connect the capacitor to the second integrating means.

10. The apparatus of claim 9 in which the reset means further operates to disconnect the capacitor from the second integrating means just prior to the time that the reset means reinserts the initial conditions into the integrating means.

References Cited

UNITED STATES PATENTS

| | | | |
|---|---|---|---|
| 3,205,345 | 9/1965 | Gruet | 235—184 |
| 3,249,748 | 5/1966 | Fluhr | 235—183 |
| 3,264,459 | 8/1966 | Ericson | 235—183 |
| 3,404,262 | 10/1968 | Udall | 235—183 |

MALCOLM A. MORRISON, Primary Examiner

F. D. GRUBER, Assistant Examiner

U.S. Cl. X.R.

235—150.31, 150.51, 182, 184; 328—127